US009942164B2

(12) United States Patent
Yasunaga et al.

(10) Patent No.: US 9,942,164 B2
(45) Date of Patent: Apr. 10, 2018

(54) MOBILE INFORMATION TERMINAL AND PROGRAM THEREOF

(71) Applicant: TOSHIBA TEC KABUSHIKI KAISHA, Shinagawa-ku, Tokyo (JP)

(72) Inventors: Masaaki Yasunaga, Shizuoka (JP); Akihiko Fujiwara, Kanagawa (JP); Mika Hirama, Tokyo (JP); Tetsuya Nobuoka, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 14/684,544

(22) Filed: Apr. 13, 2015

(65) Prior Publication Data

US 2015/0312164 A1    Oct. 29, 2015

(30) Foreign Application Priority Data

Apr. 25, 2014  (JP) ................ 2014-091820

(51) Int. Cl.
| | |
|---|---|
| G06F 15/16 | (2006.01) |
| G06F 15/173 | (2006.01) |
| H04L 12/911 | (2013.01) |
| H04W 12/08 | (2009.01) |
| H04W 40/24 | (2009.01) |
| H04W 4/20 | (2018.01) |

(52) U.S. Cl.
CPC ............ *H04L 47/70* (2013.01); *H04W 12/08* (2013.01); *H04W 4/206* (2013.01); *H04W 40/244* (2013.01)

(58) Field of Classification Search
CPC .............................. H04L 47/70; H04W 12/08

USPC .......................................... 709/203, 225, 211
See application file for complete search history.

(56) References Cited

U.S. PATENT DOCUMENTS

| | | | |
|---|---|---|---|
| 2007/0178908 A1* | 8/2007 | Doyle | G08G 1/127 455/456.1 |
| 2012/0290389 A1* | 11/2012 | Greenough | G06Q 30/0261 705/14.53 |
| 2014/0258531 A1* | 9/2014 | Sarda | H04B 5/0031 709/225 |
| 2014/0380500 A1* | 12/2014 | Park | H04L 63/102 726/27 |
| 2015/0249617 A1* | 9/2015 | Chang | H04L 47/70 709/225 |

FOREIGN PATENT DOCUMENTS

JP    2013-012140    1/2013

* cited by examiner

*Primary Examiner* — Ramy M Osman
*Assistant Examiner* — Sahera Halim
(74) *Attorney, Agent, or Firm* — Amin, Turocy & Watson LLP (57) ABSTRACT

A mobile information terminal determines whether or not access to a site which is specified by a signal is permitted when the signal transmitted from a transmission source is received, based on identification information. When it is determined that access to the site is permitted, the terminal changes a state of the identification information to a state in which access is not permitted by accessing the site. When it is determined that access to the site is not permitted, the terminal receives an instruction on access to the site while the signal is received. When the instruction on access is received, the terminal accesses the site.

19 Claims, 8 Drawing Sheets

| BEACON ID | LINK DESTINATION URL | AAF | ACF | T |
|---|---|---|---|---|
| 001 | http://WWW.aaa.com | 1/0 | 1/0 | 0 |
| 002 | http://WWW.bbb.com | 1/0 | 1/0 | 0 |
| 003 | http://WWW.ccc.com | 1/0 | 1/0 | 0 |
| ⋮ | ⋮ | ⋮ | ⋮ | ⋮ |

MOBILE INFORMATION TERMINAL AND PROGRAM THEREOF

CROSS-REFERENCE TO RELATED APPLICATION

This application is based upon and claims the benefit of priority from Japanese Patent Application No. 2014-091820, filed Apr. 25, 2014, the entire contents of which are incorporated herein by reference.

FIELD

Embodiments described herein relate generally to a mobile information terminal, and a program thereof.

BACKGROUND

In recent years, the spread of mobile information terminals such as a tablet personal computer (PC), and a smart phone is remarkable, and many people carry the mobile information terminals. Therefore, a service promoting store visits by distributing coupons, information on a sales event, or the like, to a mobile information terminal of a person in close proximity to the store has been proposed. Since, in a service of this type, a service is provided by being interlocked with a position of the mobile information terminal, the service is referred to as a position interlocking service.

As an example of a system which executes the position interlocking service, there is a system in which a beacon signal is used. When this system is built, a store which provides the service installs a transmitter of the beacon signal in an area in the vicinity of the store, for example. Meanwhile, a user who receives the service installs a dedicated application program (hereinafter, referred to as position interlocking program) in a mobile information terminal in advance. The position interlocking program is activated when the mobile information terminal receives a beacon signal. In addition, a browser is started up due to the position interlocking program, and a coupon, information on sales events, or the like, which is distributed from a Web site is displayed on a display of the mobile information terminal.

Here, even when a user consciously closes a browser, the browser restarts, and the same information is displayed as long as the mobile information terminal receives the beacon signal, and this is very annoying. In order to avoid such an inconvenience, there is a mechanism in which, when the mobile information terminal receives a beacon signal once, the beacon signal is not received until a fixed time elapses. However, when such a mechanism is adopted, since access to a Web site is interrupted when a user closes the browser by mistake, there is a problem in that it is not possible to access the Web site until a fixed time elapses.

JP-A-2013-012140 is an example of the related art.

DETAILED DESCRIPTION

An object of one embodiment is to provide a mobile information terminal which is activated when receiving a signal transmitted from a transmission source, and performs automatic access to a predetermined Web site, in which it is not possible to re-access the Web site after being interrupted once, as long as it is not intended by a user, and in which it is possible to re-access the Web site immediately, when it is intended by the user.

According to one embodiment, a mobile information terminal includes reception means, storage means, determination means, automatic access means, acceptance means, and manual access means. The reception means receives a signal which is transmitted from a transmission source. The storage means stores identification information which identifies whether or not access to a site on a network which is specified by the signal is permitted. The determination means determines whether or not access to the site which is specified by the signal is permitted from the identification information while the reception means is receiving the signal. The automatic access means changes a state of the identification information to a state in which access is not permitted by accessing the site when it is determined that access to the site is permitted by the determination means. The acceptance means receives an instruction on access to the site while the signal is received in the reception means, when it is determined that access is not permitted by the determination means. The manual access means accesses the site when receiving the instruction on access to the site using the acceptance means.

Hereinafter, embodiments of a mobile information terminal which is activated by receiving a signal transmitted from a transmission source, and performs automatic access of a predetermined Web site will be described with reference to drawings.

In addition, all of embodiments which will be described below relate to a position interlocking service in which a digital signage device (hereinafter, abbreviated by signage device) which is installed in a shopping center cooperates with a mobile information terminal which is carried by a user (customer), and service information (coupon, product image, or the like) related to an advertisement which is displayed on a display device of the signage device can be received using the mobile information terminal of the user who is browsing the advertisement.

First Embodiment

Figure 1:
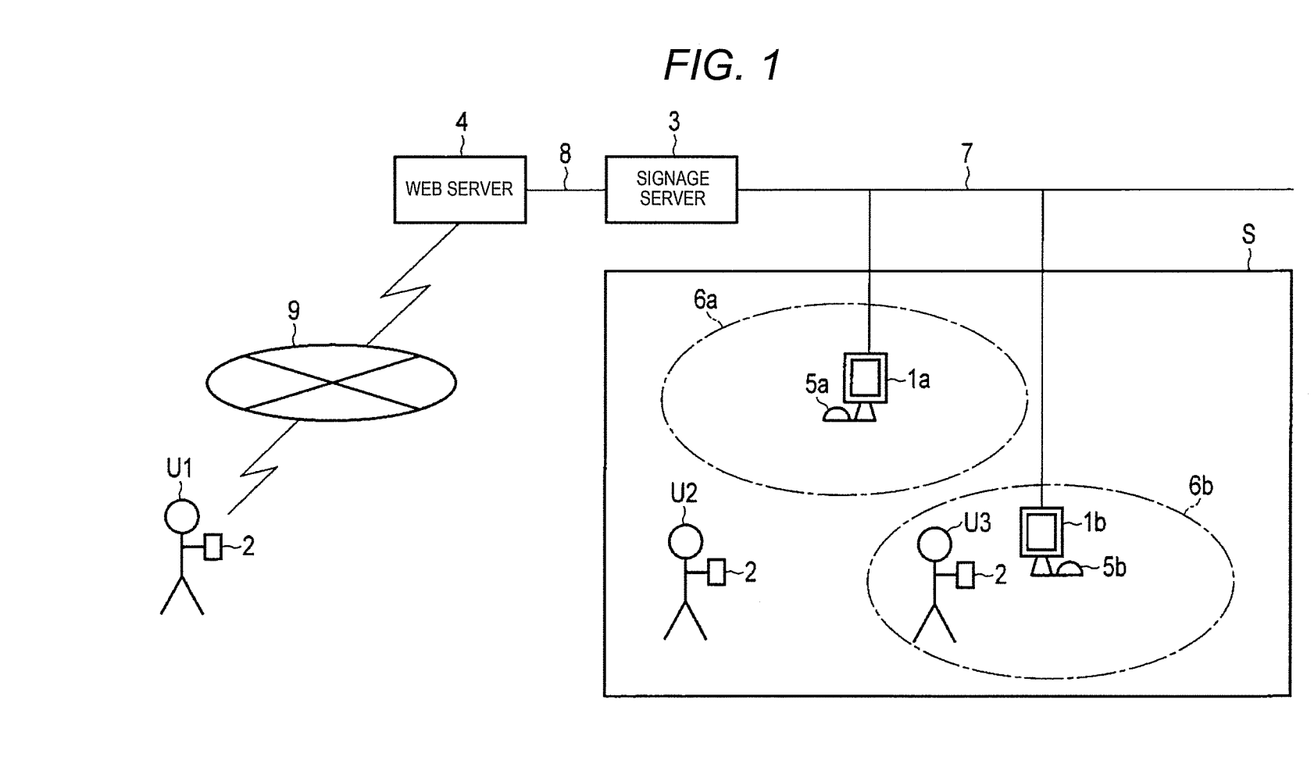
FIG. 1 is the entire configuration diagram of a system which executes a position interlocking service.

FIG. 1 is the entire configuration diagram of a system which executes a position interlocking service. The system includes a plurality of signage devices 1 (in FIG. 1, two signage devices, 1a and 1b, are illustrated), a mobile information terminal 2 which is carried by a user U (in FIG. 1, three users U1, U2, and U3 are illustrated), a signage server 3, and a Web server 4.

Each signage device 1 is installed at an arbitrary location in a shopping center S, for example, a passage, or the like, through which shoppers come and go, and displays contents denoting advertisement information of products, or the like. Each of signage devices 1 includes WiFi routers 5 (two WiFi routers 5a and 5b are illustrated in FIG. 1) which function as transmission sources which transmit a beacon signal, respectively. The WiFi router 5 may be mounted on the signage device 1, and may be connected to the signage device 1 through a communication cable. Each signage device 1 is arranged in the shopping center S with predetermined intervals so that communication regions 6 of the WiFi routers 5 (communication regions 6a and 6b of the two WiFi routers 5a and 5b are illustrated in FIG. 1) are not overlapped with each other.

Each signage device 1 is connected to the signage server 3 through a wired or wireless dedicated network 7. The signage server 3 manages contents which are displayed in each signage device 1. The signage server 3 delivers contents to each signage device 1 according to a schedule which is set in advance. Each signage device 1 displays contents which are delivered from the signage server 3 through the dedicated network 7. The contents may be similar in each signage device 1, or may be different in each signage device 1.

The signage server 3 is connected to the Web server 4 through a wired or wireless dedicated network 8. The Web server 4 manages Web contents (Web page) which can be browsed on a Web browser.

The mobile information terminal 2 is installed with a Web browser, and can access the Web server 4 via the Internet 9 using the Web browser. In addition, the mobile information terminal 2 has a function of near field wireless communication in which a WiFi (wireless LAN) system is adopted. When a line connection is set up using a communication protocol using the WiFi system between the mobile information terminal 2 and the WiFi router 5, the mobile information terminal 2 can access the Web server 4 through the dedicated network 7 and the dedicated network 8.

The mobile information terminal 2 which accesses the Web server 4 can browse Web contents on a Web browser, or download a desired data file. As such a mobile information terminal 2, a smart phone, a tablet PC, a mobile phone, a notebook-type personal computer, or the like, is used.

Figure 2:
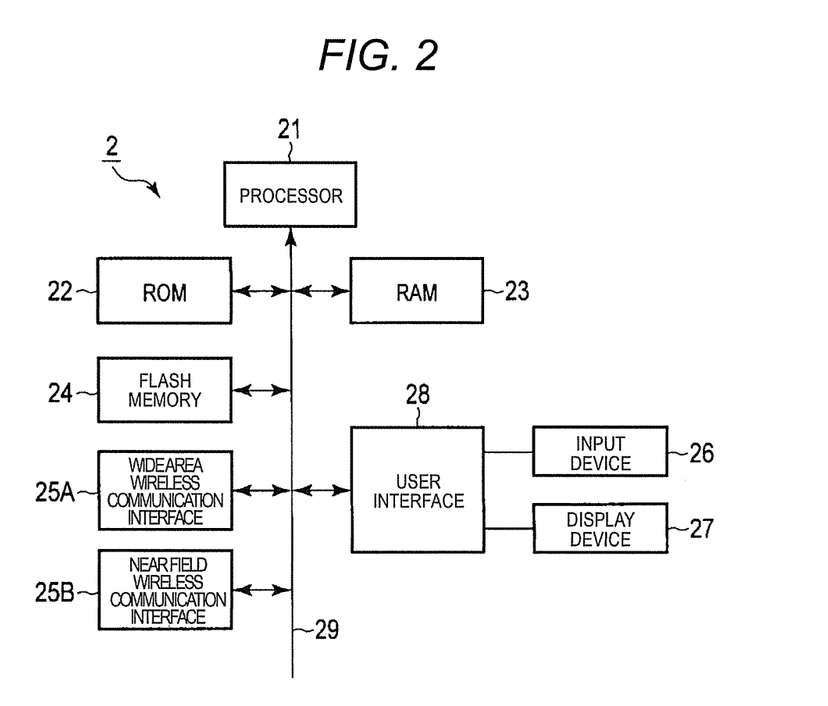
FIG. 2 is a block diagram which illustrates configurations of main parts of a mobile information terminal.

FIG. 2 is a block diagram which illustrates configurations of main parts of the mobile information terminal 2. The mobile information terminal 2 includes a processor 21, a Read Only Memory (ROM) 22, a Random Access Memory (RAM) 23, a flash memory 24, a wide area wireless communication interface 25A, a near field wireless communication interface 25B, an input device 26, a display device 27, and a user interface 28. In addition, the mobile information terminal 2 connects the processor 21, the ROM 22, the RAM 23, the flash memory 24, the wide area wireless communication interface 25A, the near field wireless communication interface 25B, and the user interface 28 using a bus line 29 such as an address bus, and a data bus.

The processor 21 functions as a nerve center of a computer. The processor 21 controls each unit so as to execute various functions as the mobile information terminal 2 according to an operating system or an application program.

The ROM 22 corresponds to a main storage portion of the computer. The ROM 22 stores the above described operating system or application program. There also is a case in which the ROM 22 stores data which is necessary when the processor 21 executes a process for controlling each unit.

The RAM 23 corresponds to a main storage portion of the computer. The RAM 23 stores data which is necessary when the processor 21 executes a process. In addition, the RAM 23 is also used as a work area in which information is appropriately rewritten by the processor 21.

The flash memory 24 corresponds to an auxiliary storage portion of the computer. The flash memory 24 stores data which is used when the processor 21 performs various processes, or data which is generated during a process performed in the processor 21. There also is a case in which the flash memory 24 further functions as the ROM 22 and the RAM 23, and the ROM 22 and the RAM 23 are omitted.

The wide area wireless communication interface 25A accesses an external device which includes the Web server 4 in a wireless manner through the Internet 9 which is a wide area wireless communication network. The near field wireless communication interface 25B accesses a near field wireless communication device which includes the WiFi router 5 in a wireless manner using the WiFi system which is a near field wireless communication system.

The user interface 28 has a function of receiving a data signal which is input through the input device 26, and a function of outputting display data to the display device 27. When the mobile information terminal 2 is a smart phone or a tablet PC, in general, the input device 26 is a touch panel sensor, and the display device 27 is a liquid crystal display. When the mobile information terminal 2 is a notebook-type personal computer, there is a case in which a keyboard, a pointing device, or the like, is set as the input device 26.

The mobile information terminal 2 with such a configuration can handle a position interlocking service in which the mobile information terminal cooperates with the signage device 1, when a predetermined application program (hereinafter, referred to as position interlocking program) is installed therein. For example, the mobile information terminal 2 can download service information (coupon, product image, or the like) related to an advertisement which is displayed on the display device of the signage device 1. In addition, it is possible for a user to play a game, or the like, which is displayed on the display device of the signage device 1 when the mobile information terminal 2 functions as a controller of the signage device 1.

Figure 3:
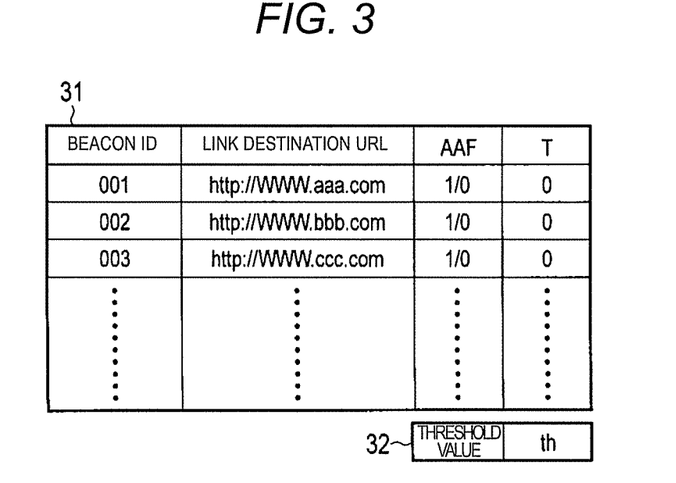
FIG. 3 is a schematic diagram which illustrates a main memory region which is formed in a flash memory of the mobile information terminal.

When the position interlocking program is installed, a list table 31 and a threshold value file 32 are formed in the flash memory 24.

The list table 31 can store a plurality of data records which are formed of each item value of a beacon ID, a link destination Uniform Resource Locator (URL), an automatic access flag AAF, and a timer counter T.

The beacon ID is a specific code included in a beacon signal which is periodically transmitted from a beacon transmitter such as a WiFi router 5. Specific beacon IDs which are different from each other are included in the beacon signal which is transmitted from the beacon transmitter.

The link destination URL is address information regarding a Web which designates a Web site to be accessed when receiving a beacon signal which includes a corresponding beacon ID. The mobile information terminal 2 accesses a Web site which is specified by the link destination URL using a Web browser, and displays Web contents of the Web site on the display device 27.

The automatic access flag AAF is information used for identifying whether or not automatic access to a Web site which is specified by a corresponding link destination URL is to be permitted. According to the embodiment, the automatic access is permitted when the automatic access flag AAF is "1", and is not permitted when the automatic access flag AAF is "0". A default value of the automatic access flag AAF is set to "1".

The timer counter T is counted up every time a beacon signal including a corresponding beacon ID is received, when the automatic access flag AAF is "0", that is, it is in a state in which the automatic access is not permitted. In addition, when the automatic access flag AAF becomes "1", the timer counter T becomes "0", and is reset. The beacon transmitter transmits a beacon signal with a constant period. Accordingly, a value of the timer counter T corresponds to an elapsed time after being in a state of not permitting the automatic access.

The threshold value file 32 stores a threshold value th with respect to the timer counter T. The mobile information terminal 2 does not access the same Web site until a fixed time elapses after accessing the Web site which is specified by a link destination URL corresponding to a beacon ID of a received beacon signal once. In order to execute this function, the threshold value th is used. As described above, a value of the timer counter T corresponds to an elapsed time after being in the state of not permitting the automatic access. Accordingly, the threshold value th is caused to match the value of the timer counter T corresponds to the fixed time. In addition, the processor 21 sets the automatic access flag AAF to "0" until the timer counter T reaches the threshold value th, and sets the automatic access flag AAF to "1" when the timer counter T exceeds the threshold value th. Due to such a control being used, the mobile information terminal 2 does not access the same Web site until a fixed time elapses after accessing the Web site, and can access the Web site after a fixed amount of time elapses.

A predetermined threshold value th (for example, a value corresponding to 10 minutes) is set in advance in the threshold value file 32. The threshold value th may be a fixed value, or may be arbitrarily changed by a user of the mobile information terminal 2.

The mobile information terminal 2 in which the position interlocking program is installed has a function as a list creation mode, and a function as a position interlocking mode. The list creation mode is a mode for allowing the user U to register a data record in the list table 31. The position interlocking mode is a mode for allowing the user U to receive a position interlocking service using the mobile information terminal 2. These modes are executed when the processor 21 is operated according to the position interlocking program.

That is, when a user starts up the position interlocking program, a selection screen of the list creation mode and the position interlocking mode is displayed on the display device 27. Here, a user who wants to register a data record in the list table 31 selects the list creation mode by operating the input device 26.

Figure 4:
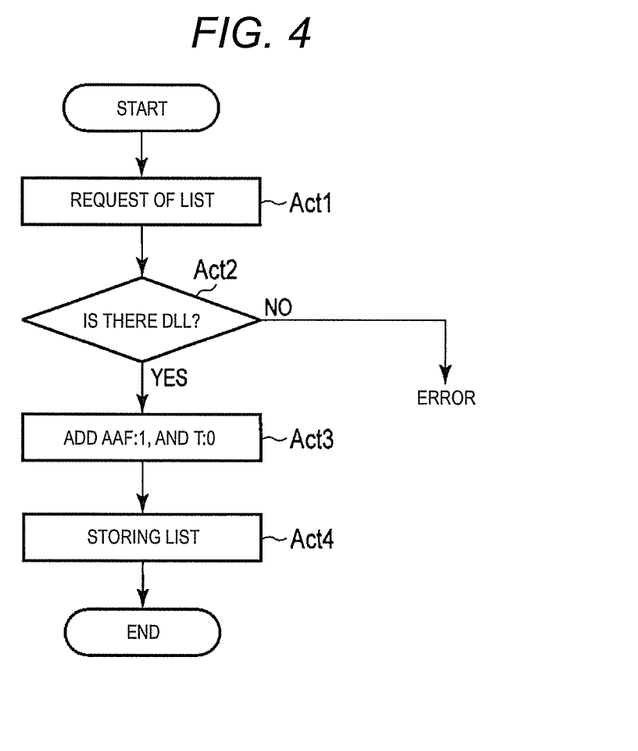
FIG. 4 is a flowchart which illustrates a procedure of information processing which is executed by a processor of the mobile information terminal in which a list creation mode is selected.

When the list creation mode is selected, the processor 21 starts information processing using a procedure which is illustrated in the flowchart in FIG. 4. First, the processor 21 transmits a list request command to the Web server 4 through the wide area wireless communication interface 25A in Act 1.

The list request command is transmitted to the Web server 4 via the Internet 9. The Web server 4 which receives the list request command downloads list data in which a beacon ID and a link destination URL make a pair to the mobile information terminal 2 which is a transmission source of the command.

The list data is generated by the signage server 3. That is, the signage server 3 creates list data in which a URL of a Web site which can receive a position interlocking service which is provided from the signage device 1 is set by being correlated with a beacon ID of a beacon signal which is transmitted from the WiFi router 5 provided in the signage device 1 which is being managed. The list data is possessed by the signage server 3, may be transmitted to the Web server 4 according to a request from the Web server 4, and may be possessed by the Web server 4 when the signage server 3 transmits the list data to the Web server 4 in a timely manner.

The processor 21 which transmits the list request command waits for the list data to be downloaded in Act 2. Here, when the list data is not downloaded at a predetermined time (No in Act 2), the processor 21 processes a transmission of the command as an error.

In contrast to this, when the list data is downloaded (Yes in Act 2), in Act 3, the processor 21 adds the automatic access flag AAF and the timer counter T to data in which a beacon ID and a link destination URL which are included in the list data make a pair. At this time, the automatic access flag AAF is "1" and the timer counter T is "0". The processor 21 stores (registration unit) the list data to which the automatic access flag AAF and the timer counter T are added in the list table 31 as Act 4.

In this manner, information processing is ended when selecting the list creation mode. Due to the information processing, performed in the mobile information terminal 2 which is carried by the user U, a data record for receiving the position interlocking service in the shopping center S is registered in the list table 31.

In addition, in the above descriptions, list data which is downloaded through the Web server 4 is set to a pair of data items in which the beacon ID and the link destination URL make a pair; however, the list data is not limited to the form. For example, the Web server 4 may download data in which the automatic access flag AAF (AFF=1) and the timer counter T (T=0) are added to the beacon ID and the link destination URL to the mobile information terminal 2 as list data. In this form, the processor 21 stores the list data which is downloaded from the Web server 4 in the list table 31 as is. Accordingly, the process in Act 3 in FIG. 4 is omitted.

In addition, it is possible to include the link destination URL in the beacon signal which is transmitted from the beacon transmitter such as the WiFi router 5. Therefore, the Web server 4 may download only a beacon ID to the mobile information terminal 2 as list data. According to the form, it is possible to omit a storage area of the link destination URL from the list table 31.

A user who registered a data record in the list table 31 starts up the position interlocking program even when the user goes to the shopping center S. By doing so, a selection screen of the list creation mode and the position interlocking mode is displayed, and accordingly, the user selects the position interlocking mode by operating the input device 26.

Figure 5:
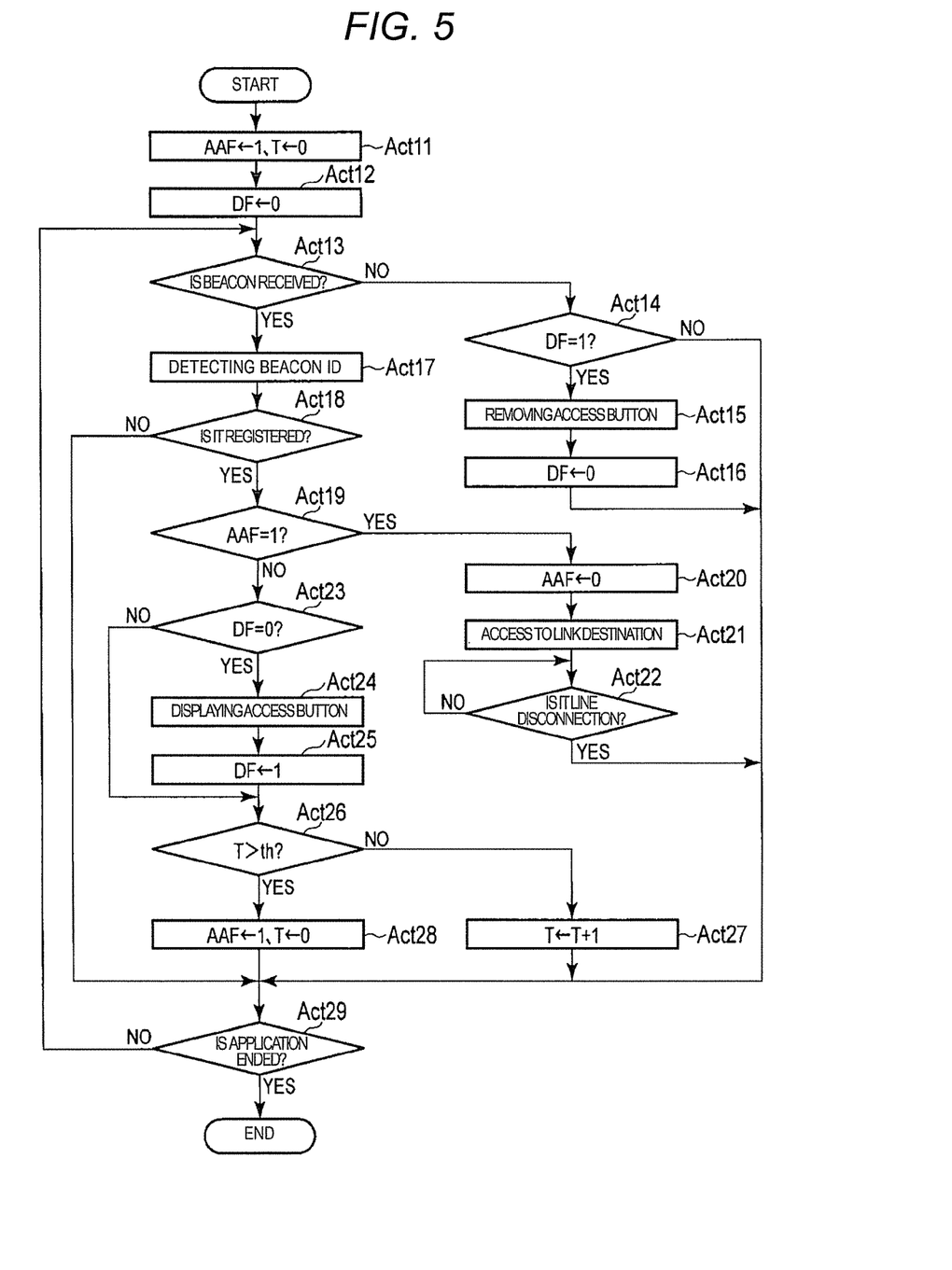
FIG. 5 is a flowchart which illustrates a procedure of information processing which is executed by the processor of the mobile information terminal in which a position interlocking mode is selected, in a first embodiment.

When the position interlocking mode is selected, the processor 21 starts information processing through a procedure which is illustrated in the flowchart in FIG. 5. First, the processor 21 sets the automatic access flag AAF of all of the data records which are registered in the list table 31 to "1" in which the automatic access is possible, in Act 11. In addition, the processor 21 resets the timer counter T of all of the data records to "0".

In addition, the processor 21 initializes a flag DF which is being displayed so as to be "0" in Act 12. The flag DF which is being displayed is information which identifies whether or not an image of an access button 40 which will be described later is displayed on the display device 27, and is stored in the RAM 23. According to the embodiment, the flag which is being displayed is set to "1", and the flag which is not being displayed is set to "0".

Processing procedures in Act 11 and Act 12 are not limited to the above descriptions. In the procedure, first, the flag DF which is being displayed may be initialized so as to be "0", and subsequently, the automatic access flag AAF and the timer counter T of the list table 31 may be set to "1" and "0".

When processes in Act 11 and Act 12 are ended, the processor 21 confirms whether or not a beacon signal is received in Act 13. The beacon signal is periodically transmitted from the beacon transmitter which includes the WiFi router 5 at regular intervals. Accordingly, the processor 21 monitors the near field wireless communication interface 25B for a sufficiently longer amount of time than that of a transmission cycle of the beacon signal, and confirms whether or not the beacon signal is received (reception unit).

When the beacon signal is not received (No in Act 13), the processor 21 checks on the flag DF which is being displayed in Act 14. When the flag DF which is being displayed is "0" (No in Act 14), the processor 21 proceeds to a process in Act 29.

In Act 14, when the flag DF which is being displayed is "1" (Yes in Act 14), the access button 40 is displayed on the display device 27. In this case, the processor 21 removes the access button 40 in Act 15. In addition, the processor 21 resets the flag DF which is being displayed to "0" in Act 16.

The processing procedures in Act 15 and Act 16 are not limited to the above descriptions. In the procedure, first, the flag DF which is being displayed may be reset to "0", and subsequently, the access button 40 may be removed.

When the processes in Act 15 and Act 16 are ended, the processor 21 proceeds to a process in Act 29.

In Act 13, when the beacon signal is received (Yes in Act 13), the processor 21 detects a beacon ID from the beacon signal in Act 17. In addition, the processor 21 confirms whether or not the detected beacon ID is registered in the list table 31 in Act 18. When the beacon ID is not registered (No in Act 18), the processor 21 proceeds to a process in Act 29.

When the detected beacon ID is registered in the list table 31 (Yes in Act 18), the processor 21 checks on the automatic access flag AAF which is registered in the list table 31 by being correlated with the beacon ID (determination unit) in Act 19. When the automatic access flag AAF is "1" (Yes in Act 19), the processor 21 changes the automatic access flag AAF to "0" in Act 20. In addition, the processor 21 obtains the link destination URL which is registered in the list table 31 by being correlated with the beacon ID in Act 21. In addition, the processor 21 accesses a Web site which is specified by the link destination URL through the near field wireless communication interface 25B (automatic access unit).

The processing procedures in Act 20 and Act 21 are not limited to the above descriptions. In the procedure, first, access to the Web site which is specified in the link destination URL may be performed, and subsequently, the automatic access flag AAF may be changed to "0".

When the processes in Act 20 and Act 21 are ended, the processor 21 waits for a command for line disconnection with the Web site in Act 22. When the line disconnection command is given as an operation input of the input device 26 (Yes in Act 22), the processor 21 proceeds to a process in Act 29.

When the automatic access flag AAF is "0" in Act 19 (No in Act 19), the processor 21 checks on the flag DF which is being displayed in Act 23. When the flag DF which is being displayed is "0" (Yes in Act 23), the processor 21 displays the access button 40 which is a shortcut button to the link destination on the display device 27 in Act 24 (acceptance unit). In addition, the processor 21 sets the flag DF which is being displayed to "1" in Act 25.

The process procedures in Act 24 and Act 25 are not limited to the above descriptions. In the procedure, the flag DF which is being displayed may be set to "1", and subsequently, the access button 40 may be displayed.

Figure 7:
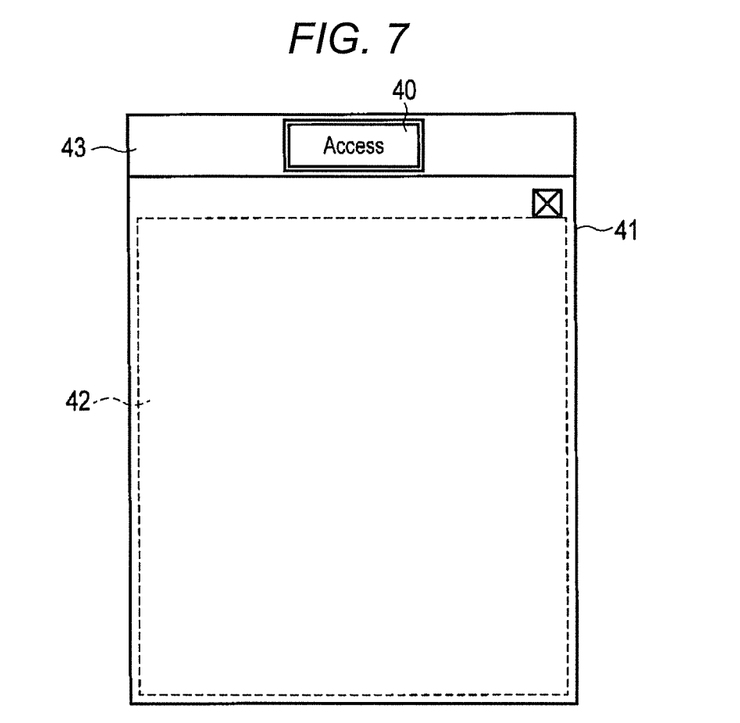
FIG. 7 is a schematic diagram which illustrates an example of display of an access button.

FIG. 7 is an example of a screen on which the access button 40 is displayed in the display device 27. In the example, a screen 41 of the display device 27 is divided into a display region 42 which includes the Web contents and a non-display region 43. In addition, in the example, the access button 40 is arranged in the non-display region 43. In this manner, it is possible for a user to view the access button 40 regardless of whether or not the Web contents are displayed in the display region 42, by displaying the access button 40 in the non-display region 43.

In Act 23, the processor 21 confirms whether or not the timer counter T which is registered in the list table 31 by being correlated with the beacon ID exceeds the threshold value th of the threshold value file 32 in Act 6, when the flag DF which is being displayed is set to "1" in advance, or when processes in Act 24 and Act 25 are ended. When the timer counter T does not exceed the threshold value th (No in Act 26), the processor 21 counts up the timer counter T by "1" in Act 27.

In contrast to this, when the timer counter T exceeds the threshold value th (Yes in Act 26), the processor 21 resets the automatic access flag AAF which is registered in the list table 31 by being correlated with the beacon ID to "1", and resets the timer counter T to "0" in Act 28 (control unit) When the process in Act 27 or Act 28 is ended, the processor 21 proceeds to the process in Act 29.

In Act 29, the processor 21 confirms whether or not ending of the position interlocking program is declared. When the ending is not declared (No in Act 29), the processor 21 returns to the process in Act 13. In addition, the processor 21 re-executes the processes in Act 13 and those thereafter.

When ending of the position interlocking program is declared (Yes in Act 29), the processor 21 ends the information processing through the procedure which is illustrated in the flowchart in FIG. 5.

Figure 6:
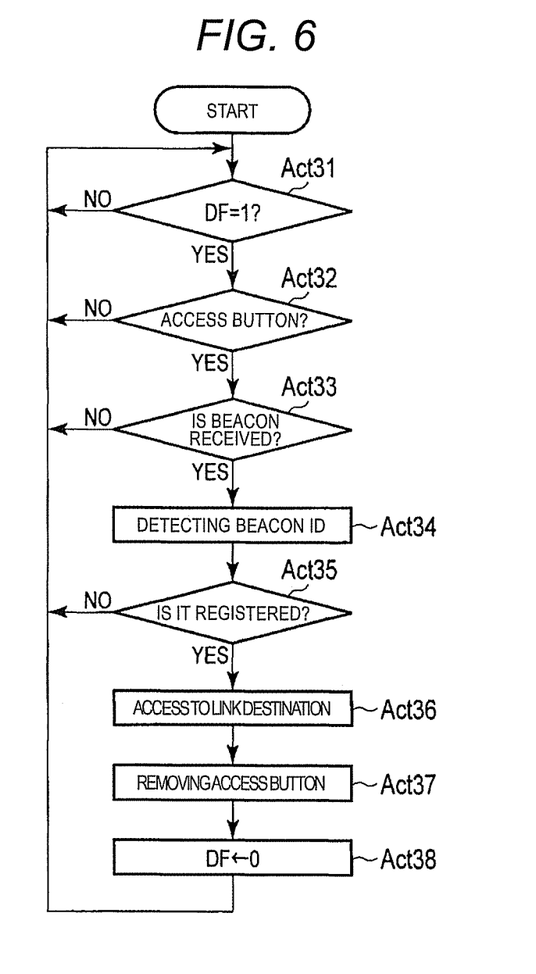
FIG. 6 is a flowchart which illustrates a procedure of interruption processing which is executed by the processor of the mobile information terminal in which the position interlocking mode is selected, in the first embodiment.

In addition, the processor 21 repeatedly executes interruption processing through a procedure which is illustrated in the flowchart in FIG. 6 when the position interlocking mode is selected. First, the processor 21 checks on the flag DF which is being displayed in Act 31. When the flag DF which is being displayed is reset to "0" (No in Act 31), the processor 21 waits for setting of the flag DF, which is being displayed, to "1".

When the flag DF which is being displayed is set to "1" (Yes in Act 31), the processor 21 waits for inputting of the access button 40 in Act 32. When the access button 40 is not input (No in Act 32), the processor 21 returns to the process in Act 31. Accordingly, when the flag DF which is being displayed is set to "1", the processor 21 waits for inputting of the access button 40, and when the flag DF which is being displayed is reset to "0", the processor 21 waits for setting of the flag DF, which is being displayed, to "1".

When the access button 40 is input in a state in which the flag DF which is being displayed is set to "1" (Yes in Act 32), the processor 21 confirms whether or not the beacon signal is received in Act 33. When the beacon signal is not received (No in Act 33), the processor 21 returns to the process in Act 31. Accordingly, when the beacon signal is not received even when the access button 40 is input, the processor 21 waits for a re-input of the access button 40. In addition, when the flag DF, which is being displayed, is reset to "0" in the waiting period, the processor 21 waits for setting of the flag DF, which is being displayed, to "1".

If the beacon signal is received when the access button 40 is input (Yes in Act 33), the processor 21 detects a beacon ID from the beacon signal in Act 34. In addition, the processor 21 confirms whether or not the detected beacon ID is registered in the list table 31 in Act 35. When the beacon ID is not registered (No in Act 35), the processor 21 returns to the process in Act 31. Accordingly, when the beacon ID which is included in the beacon signal is not registered in the list table 31, even when the beacon signal is received, the processor 21 waits for a re-input of the access button 40. In addition, when the flag DF which is being displayed is reset to "0" in the waiting period, the processor 21 waits for setting of the flag DF which is being displayed to "1".

When the beacon ID is registered in the list table 31 (Yes in Act 35), the processor 21 obtains the link destination URL which is registered in the list table 31 by being correlated with the beacon ID in Act 36. In addition, the processor 21 accesses the Web site which is specified in the link destination URL through the near field wireless communication interface 25B (manual access unit). In addition, the processor 21 removes the access button 40 in Act 37. In addition, the processor 21 resets the flag DF which is being displayed to "0" in Act 38.

The processing procedures in Acts 36, 37, and 38 are not limited to the above descriptions. For example, in the procedure, first, the access button 40 may be removed, and accessing of the Web site which is specified in the link destination URL may be performed, after resetting the flag DF which is being displayed to "0". Alternatively, in the procedure, for example, the access button 40 may be removed, and the flag DF which is being displayed may be reset to "0", after accessing of the Web site which is specified in the link destination URL is performed.

When processes in Acts 36, 37, and 38 are ended, the processor 21 returns to the process in Act 31. Accordingly, the processor 21 waits for setting of the flag DF which is being displayed to "1".

As described above, in the mobile information terminal 2 in which the position interlocking mode is selected, when the beacon signal including the beacon ID which is registered in the list table 31 is received, access to the Web site which is specified in the link destination URL which is automatically correlated with the beacon ID is performed (Acts 13, 17, 18, 19, and 21). At this time, the automatic access flag AAF which is correlated with the beacon ID is changed to "0" (Act 20).

For example, in FIG. 1, the mobile information terminal 2 which is carried by the user U3 receives a beacon signal which is transmitted from the WiFi router 5b which is connected to the signage device 1b. Accordingly, when the beacon ID of the beacon signal is registered in the list table 31 of the mobile information terminal 2, the mobile information terminal 2 accesses a Web site which is specified in the link destination URL which is correlated with the beacon ID. As a result, the user U3 can receive the position interlocking service which is provided using contents of the Web site.

In contrast to this, the mobile information terminal 2 which is carried by the user U2 receives neither a beacon signal which is transmitted from the WiFi router 5b connected to the signage device 1b, nor a beacon signal which is transmitted from the WiFi router 5a connected to the signage device 1a. Accordingly, there is no case occurring in which the mobile information terminal 2 accesses the Web site specified in the link destination URL which is correlated with the beacon ID.

Meanwhile, when the user U3 intentionally disconnects from the Web site, since the automatic access flag AAF which is correlated with the beacon ID is changed to "0", there is no case occurring in which access to the Web site specified in the link destination URL which is correlated with the beacon ID is performed, even in a beacon signal which is transmitted from the WiFi router 5b (Acts 22, 13, 17, 18, 19, 26, and 27). At this time, the access button 40 is displayed in the display device 27 (Acts 23, 24, and 25).

Thereafter, even when the user U3 stays in the communication region 6b of the WiFi router 5b, there is no access to the Web site until a count value of the timer counter T reaches the threshold value th. When the count value of the timer counter T reaches the threshold value th, automatic access to the Web site is performed again (Acts 26, 29, 13, 17, 18, 19, 20, and 21).

In this manner, it is possible to avoid trouble in which immediate re-access to the Web site is performed, regardless of an intentional disconnection from the Web site. On the other hand, even when the user U3 disconnects from the Web site by mistake, since the automatic access flag AAF is changed to "0", automatic access to the Web site is not performed until the count value of the timer counter T reaches the threshold value th.

In such a case, the user U3 performs an input operation of the access button 40. In that case, the mobile information terminal 2 accesses the Web site specified in the link destination URL which is correlated with the beacon ID according to processing procedures in Act 31 to Act 38 which are the interruption processes illustrated in FIG. 6. Accordingly, it is possible to re-access the Web site immediately using a simple operation when a user intends to perform the access.

Second Embodiment

In the first embodiment, when selecting the position interlocking mode, after accessing a Web site which is specified in a link destination URL, a command for a line disconnection with the Web site is awaited (Act 22). In a second embodiment, it is possible to obtain the same operation effect as that in the first embodiment without waiting for the command for the line disconnection from the Web site. A difference between the second embodiment and the first embodiment is a data structure of the list table 31, and a part of the information processing procedures which are executed by the processor 21 when the position interlocking mode is selected. Since the other portions are the same as those in the first embodiment, the same portions are given the same reference numerals, and detailed descriptions thereof will be omitted.

Figure 8:
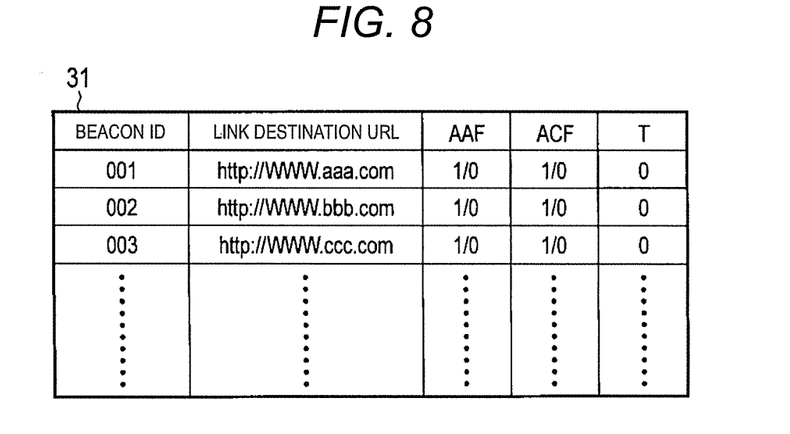
FIG. 8 is a schematic diagram which illustrates a data structure of a list table in a second embodiment.

FIG. 8 is a schematic diagram which illustrates the data structure of a list table 31 in the second embodiment. As illustrated, the list table 31 can store a plurality of data records which are formed of a value of each item of a beacon ID, a link destination URL, an automatic access flag AAF, a flag ACF which is in the middle of access, and a timer counter T.

The flag ACF which is in the middle of access is information for identifying whether or not the flag is in the middle of access to a Web site which is specified in a corresponding link destination URL. According to the embodiment, when it is in the middle of access, the flag becomes "1", and when it is not in the middle of access, the flag becomes "0".

Figure 9:
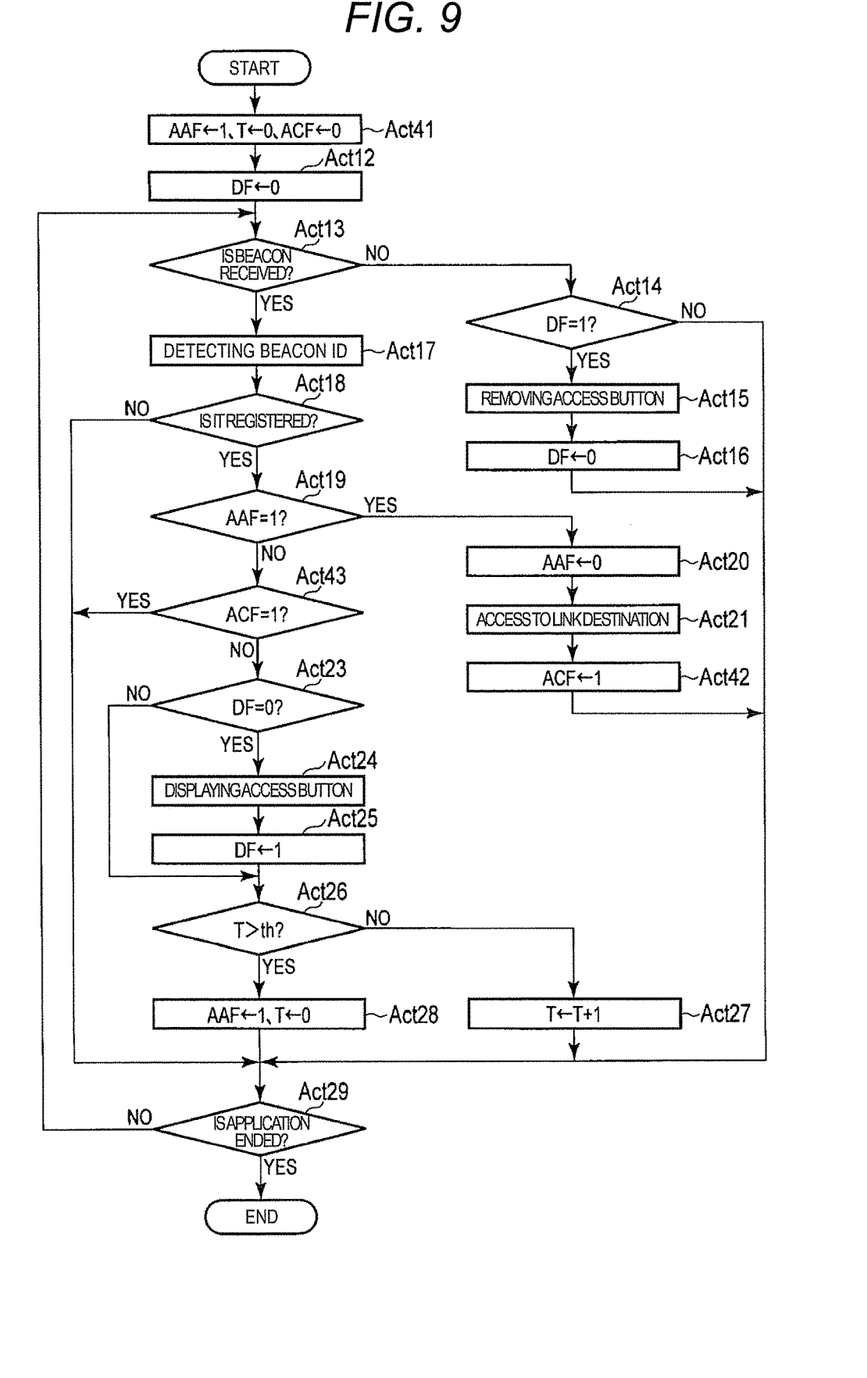
FIG. 9 is a flowchart which illustrates a procedure of information processing which is executed by the processor of the mobile information terminal in which the position interlocking mode is selected, in the second embodiment.

FIG. 9 is a flowchart which illustrates a procedure of information processing which is executed by the processor 21 when the position interlocking mode is selected in the second embodiment. When the position interlocking mode is selected, the processor 21 starts information processing through a procedure which is illustrated in the flowchart in FIG. 9. First, the processor 21 sets the automatic access flag AAF of all of data records which are registered in the list table 31 to "1" in which automatic access is possible in Act 41. In addition, the processor 21 resets the timer counter T of all of data records to "0". In addition, the processor 21 sets the flag ACF in the middle of access of all of data records to "0". In addition, the processor 21 initializes the flag DF which is being displayed so as to be "0" in Act 12.

The processing procedures in Act 41 and Act 12 are not limited to the above descriptions. In the procedure, first, the flag DF which is being displayed may be initialized so as to be "0", and subsequently, the automatic access flag AAF, the timer counter T, and the flag ACF in the middle of access of the list table 31 may be set to "1", "0", and "0", respectively.

Thereafter, processing procedures in Act 13 to Act 21 are the same as those in the first embodiment. In Act 21, a process performed after accessing the Web site which is specified in the link destination URL is different from that in the first embodiment. That is, according to the second embodiment, the processor 21 does not wait for a command for line disconnection with the Web site. The processor 21 changes the flag ACF in the middle of access which is correlated with the beacon ID, and is registered in the list table 31 to "1" in Act 42. In addition, the processor 21 proceeds to the process in Act 29.

In addition, when the automatic access flag AAF is changed to "0" as a result of checking on the flag in Act 19 (No in Act 19), the processor 21 checks on the flag ACF in the middle of access which is registered in the list table 31 by being correlated with the beacon ID in Act 43. When the flag ACF in the middle of access is changed to "1", the mobile information terminal 2 is in the middle of access to the Web site which is specified in the link destination URL corresponding to the flag ACF in the middle of access. In this case (Yes in Act 43), the processor 21 proceeds to the process in Act 29.

In contrast to this, when the flag ACF in the middle of access is not changed to "1", the mobile information terminal 2 performs a line disconnection from the Web site. In this case (No in Act 43), the processor 21 executes processes in Act 23 to Act 29.

Figure 10:
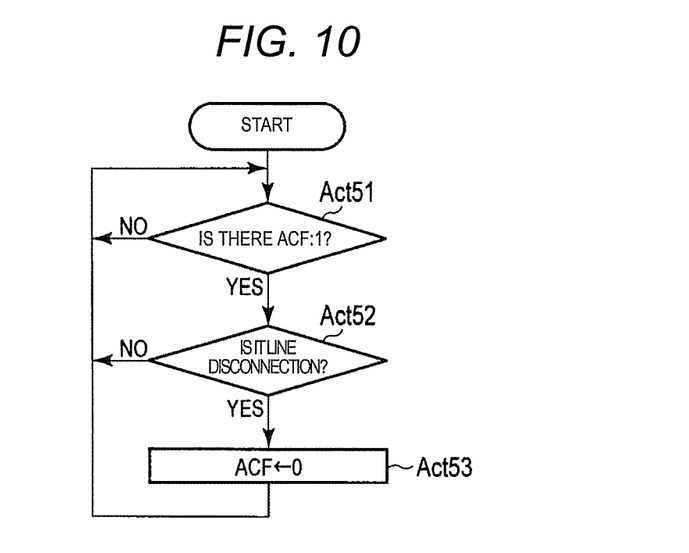
FIG. 10 is a flowchart which illustrates a procedure of interruption processing which is executed by the processor of the mobile information terminal in which the position interlocking mode is selected, in the second embodiment.

In addition, the processor 21 executes interruption processing through a procedure which is illustrated in the flowchart in FIG. 10, separately from the interruption processing in the procedure which is illustrated in the flowchart in FIG. 6, when the position interlocking mode is selected. First the processor 21 detects the list table 31, and confirms whether or not the flag ACF in the middle of access of any one of data records is changed to "1" in Act 51. When flags ACF in the middle of access of all of data records are "0" (No in Act 51), the processor 21 waits for changing of flag ACF in the middle of access of any one of data records to "1".

When the flag ACF in the middle of access of any one of data records is changed to "1" (Yes in Act 51), the processor 21 waits for a command for line disconnection from the Web site in Act 52. When the line disconnection is commanded (Yes in Act 52), the processor 21 resets the flag ACF in the middle of access which is changed to "1" to "0" in Act 53. Thereafter, the processor 21 waits for changing of the flag ACF in the middle of access of any one of data records to "1".

In this manner, also in the second embodiment, in the mobile information terminal 2 in which the position interlocking mode is selected, when a beacon signal including a beacon ID which is registered in the list table 31 is received, automatic access to a Web site which is specified in the link destination URL which is correlated with the beacon ID is performed (Acts 13, 17, 18, 19, and 21). At this time, the automatic access flag AAF which is correlated with the beacon ID is changed to "0" (Act 20). In addition, the flag ACF in the middle of access which is correlated with the beacon ID is changed to "1" (Act 42).

Accordingly, the mobile information terminal 2 periodically receives a beacon signal with the same beacon ID thereafter; however, since the flag ACF in the middle of access is maintained so as to be "1" in the middle of access to the Web site, it becomes "No" in a determination process in Act 43, and there is no display of the access button 40.

Meanwhile, when a line disconnection from the Web site is performed, the flag ACF in the middle of access returns to "0". As a result, it becomes "Yes" in a determination process in Act 43, and the access button 40 is displayed in the display device 27. In addition, when the access button 40 is input, accessing of the Web site is performed again.

In this manner, also in the second embodiment, the same operation effect as that of the first embodiment can be exhibited.

In addition, the exemplary embodiment is not limited to the above described embodiment.

Figure 11:
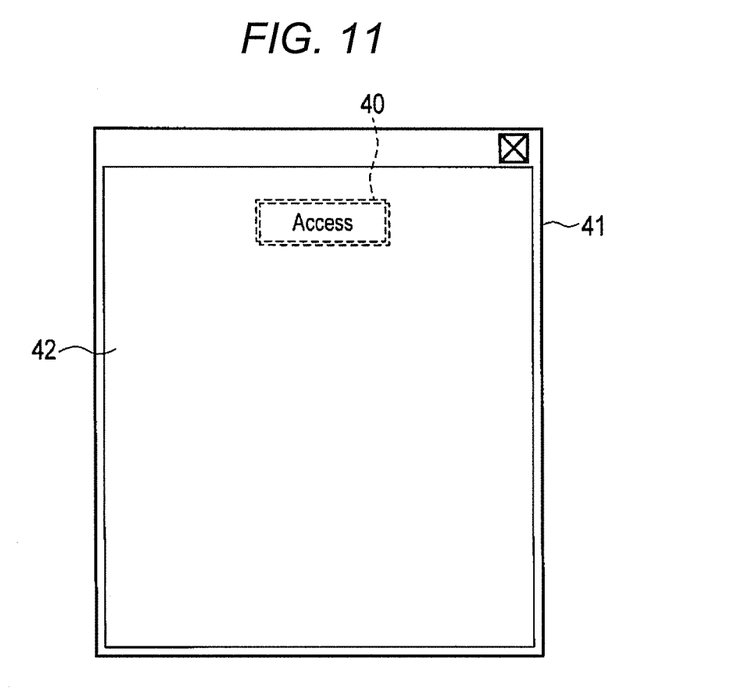
FIG. 11 is a schematic diagram which illustrates another example of the display of the access button.

For example, in the embodiment, as illustrated in FIG. 7, the screen 41 of the display device 27 is divided into the display region 42 including Web contents and the non-display region 43, and the access button 40 is arranged in the non-display region 43. A display portion of the access button 40 is not limited to the non-display region 43. For example, as illustrated in FIG. 11, the access button 40 may be displayed on the rear surface side of an image including the Web contents, by setting approximately the entire region of the screen 41 of the display device 27 to the display region 42 including the Web contents. Since the access button 40 is used as a shortcut button of a link destination after performing a line disconnection from the Web site, that is, after removing the image including the Web contents, a user is able to re-access the Web site instantly by inputting the access button 40, even when the access button 40 is arranged as illustrated in FIG. 11.

In addition, in the embodiment, a user selects the list creation mode; however, the mobile information terminal 2 may select the list creation mode automatically. For example, when the position interlocking program is started up, first, the list creation mode may be started up, and the information processing in the procedure which is illustrated in the flowchart in FIG. 4 may be executed. Alternatively, when a beacon signal which is transmitted from a beacon transmitter for check-in which is installed at an entrance, or the like, in the shopping center S is received, the list creation mode may be started up, and the information processing in the procedure which is illustrated in the flowchart in FIG. 4 may be executed.

In addition, in the embodiment, a wireless communication system between the signage device 1 and the mobile information terminal 2 is set to be the WiFi system; however, the wireless communication system is not limited to the WiFi system. For example, it is possible to adopt a wireless communication system such as a Near Field Communication (NFC), or Bluetooth (registered trademark), since these also periodically generate a beacon signal.

In addition, a signal which is used in the position interlocking service is not limited to a beacon signal. For example, it is also possible to use a GPS signal which is transmitted from a transmission source (artificial satellite) of a Global Positioning System (GPS). Specifically, a reception module of a GPS signal is mounted on the mobile information terminal 2. In addition, in the list table 31, position information which is specified by the GPS signal is registered instead of a beacon ID. By doing so, the mobile information terminal 2 which receives the GPS signal specifies a position from the GPS signal, and when the specified position information is registered in the list table 31, it is possible to automatically access a Web site of a link destination URL which is correlated with the position information, or to perform manual access according to an input of the access button 40.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile information terminal comprising:
an interface which receives a signal transmitted from a transmission source in a predetermined period;
a memory which stores identification information whose state is switched based on timer information, the identification information identifying whether or not access to a site on a network specified by the signal is permitted;
a display which displays an access button used for designating access to the site; and
a processor which executes:
a first process of monitoring reception of the signal in a span longer than the predetermined period;
a second process of confirming a state of the identification information when the interface receives the signal during the monitoring;
a third process of accessing the site specified by the signal and changing the identification information into an unpermitted state, when the identification information indicates a state where access to the site is permitted;
a fourth process of causing the display to show the access button, when the identification information indicates that access to the site is unpermitted; and
a fifth process of accessing the site specified by the signal, when the access button is operated and the interface receives the signal.

2. The terminal according to claim 1, wherein
the interface receives a beacon signal which is periodically transmitted from a wireless communication device in the predetermined period.

3. The terminal according to claim 2, wherein
the memory further stores a beacon ID which is included in the beacon signal,
the processor executes the second process to confirm the state of the identification information, when the beacon ID which is included in the beacon signal received by the interface is stored in the memory.

4. The terminal according to claim 3, wherein
the memory stores, in association with the beacon ID, the identification information and a timer counter which counts an elapsed time from a point of time when the identification information is changed into the unpermitted state.

5. The terminal according to claim 4, wherein
the identification information is an automatic access flag.

6. The terminal according to claim 4, wherein
the timer counter operates each time the interface receives the beacon signal such that a timer counter associated with the beacon ID included in the received beacon signal is counted up.

7. The terminal according to claim 6, wherein
when the timer counter indicates a predetermined value, the processor changes the identification information associated with the beacon ID together with the timer counter, from a permitted state into the unpermitted state.

8. The terminal according to claim 1, further comprising:
a timer counter which counts an elapsed time from a point of time when the identification information is changed into the unpermitted state,
wherein the processor changes the identification information, which is changed into the unpermitted state in the third process, into a permitted state when the timer counter indicates a predetermined value.

9. The terminal according to claim 8, wherein
the timer counter is counted up, each time the interface receives the signal.

10. The terminal according to claim 1, wherein
the processor accesses the site in the fifth process, or removes the access button after confirming that the signal fails to be received during monitoring in the first process.

11. The terminal according to claim 1, wherein the display includes a first screen region on which contents obtained by accessing the site are displayed and a second screen region on which the contents are not displayed.

12. The terminal according to claim 1, wherein the display includes a full screen region on which contents obtained by accessing the site are displayed, an image of the access button is displayed on part of the full screen region, and the contents are superimposed on the image of the access button.

13. The terminal according to claim 1, wherein
the memory further stores second identification information representing whether the site is being accessed, and
the processor checks the second identification information when the identification information indicates a state where access to the site is unpermitted, and displays the access button on the display when the second identification information represents the site is not being accessed.

14. A method for controlling a processor of a mobile information terminal, comprising:
   causing the processor to monitor whether or not the processor receives a signal transmitted from a transmission source in a predetermined period, the monitoring being performed in a span longer than the predetermined period;
   causing the processor to confirm a state of identification information whose state is switched based on timer information, when the processor receives the signal during monitoring, the identification information representing whether access to a side on a network specified by the signal is permitted or unpermitted;
   causing the processor to access the site specified by the signal and change the identification information into an unpermitted state, when the identification information indicates a state where access to the site is permitted;
   causing the processor to display an access button indicating access to the site, when the identification information represents a state where the access to the site is unpermitted; and
   causing the processor to access the site specified by the signal, when the access button is operated and the signal is received.

15. The method according to claim 14, wherein
the signal is a beacon signal which is periodically transmitted from a wireless communication device in a predetermined period.

16. The method according to claim 15, wherein
the processor confirms the state of the identification information when a beacon ID included in the beacon signal is stored in a memory.

17. The method according to claim 14, wherein
the processor counts an elapsed time from a point of time when the identification information is changed into the unpermitted state, and changes the identification information into a permitted state when a count value is a predetermined value.

18. The method according to claim 14, wherein
the processor checks second identification information when the identification information indicates a state where access to the site is unpermitted, the second identification information representing whether the site is being accessed, and displays the access button on the display when the site is not being accessed.

19. The method according to claim 14, wherein
the processor accesses the site in response to an operation of the access button, or removes the access button after confirming that the signal fails to be received during monitoring.

* * * * *